Figure 1:
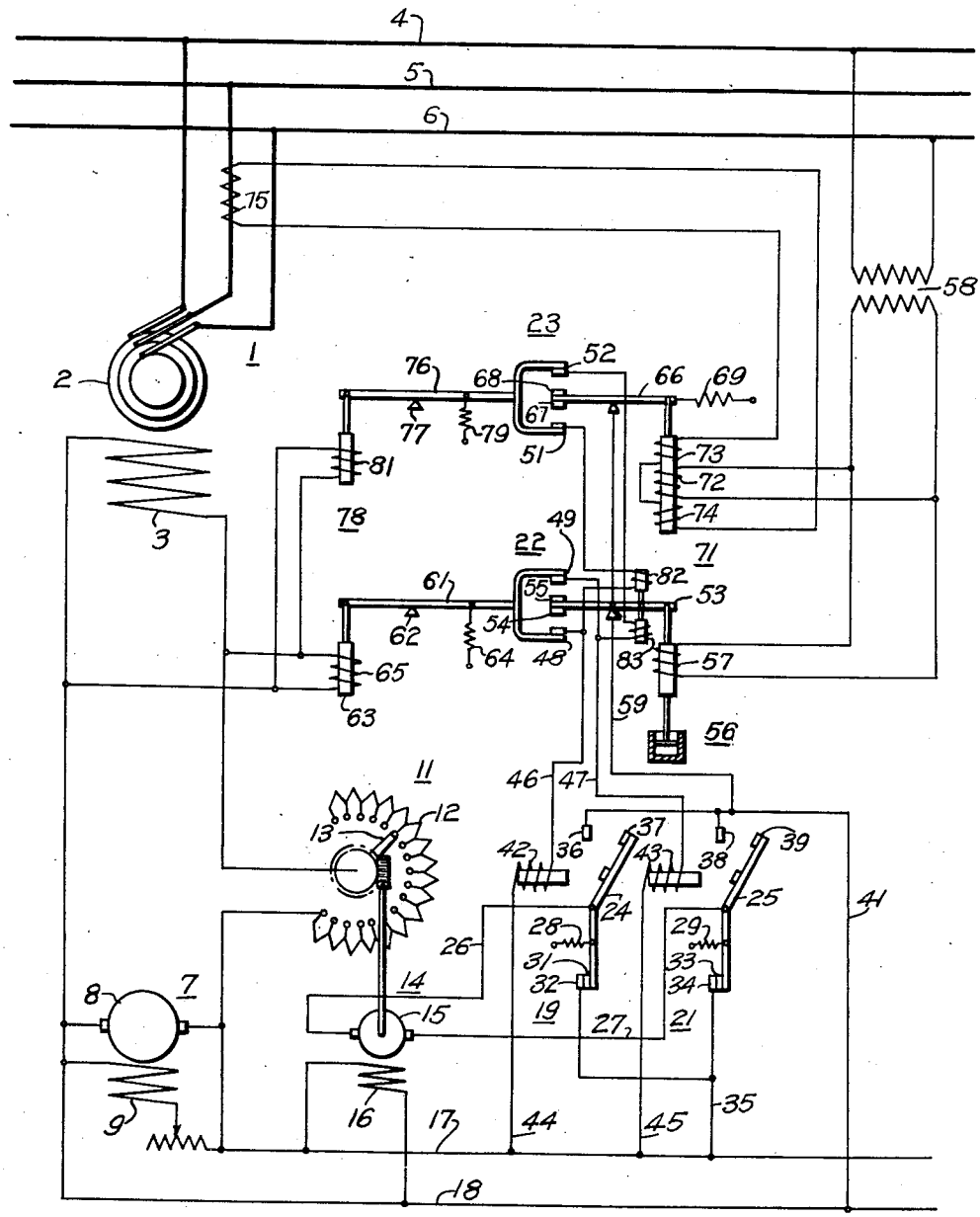

Jan. 1, 1929.

F. E. HARDY 1,697,183

REGULATOR SYSTEM

Filed July 2, 1925

2 Sheets-Sheet 1

WITNESSES:

INVENTOR
Franklin E. Hardy.
BY
ATTORNEY

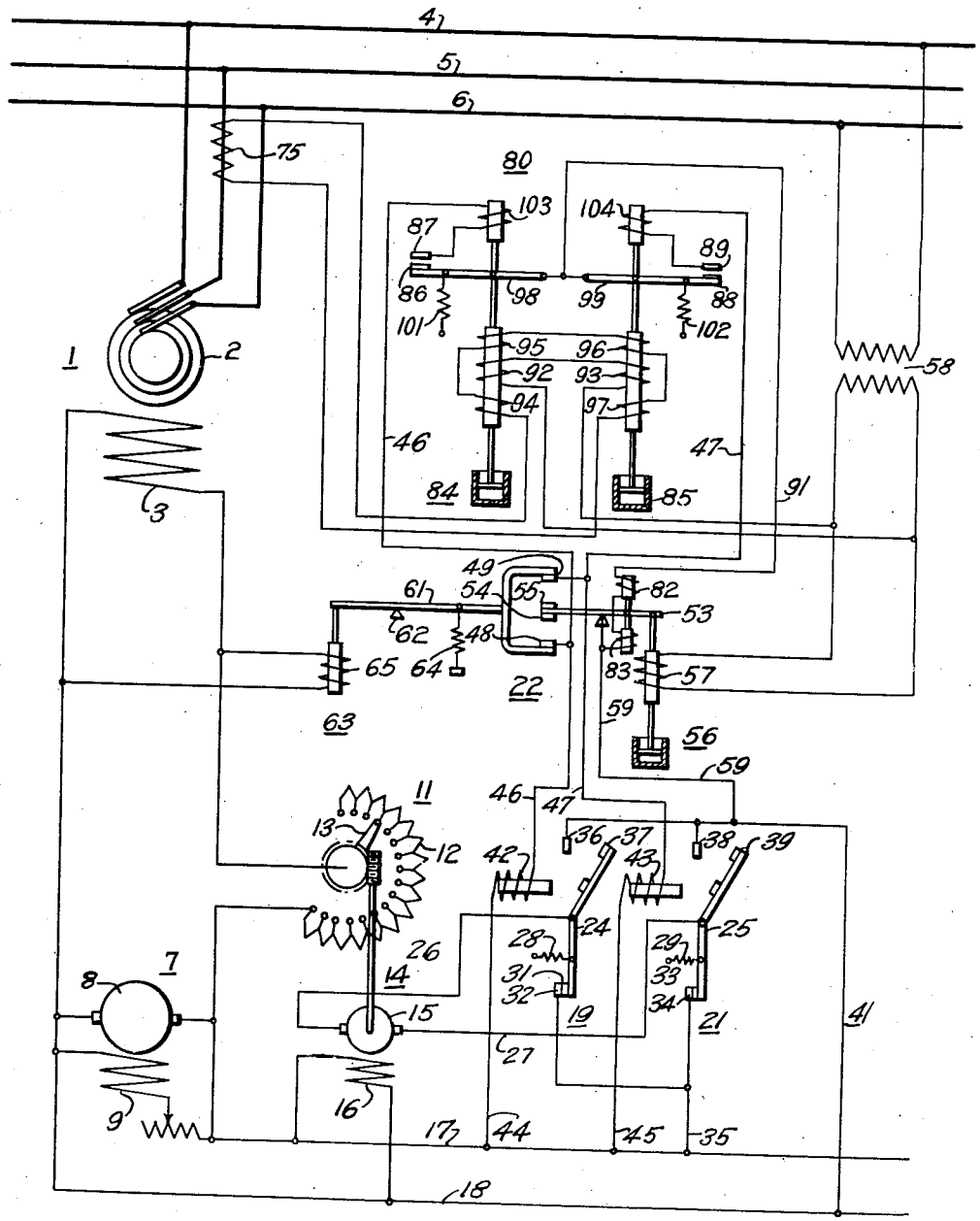

Patented Jan. 1, 1929.

1,697,183

UNITED STATES PATENT OFFICE.

FRANKLIN E. HARDY, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed July 2, 1925. Serial No. 41,040.

My invention relates to regulator systems and more particularly to providing regulator system with means for limiting the electrical power load of a dynamo-electric machine.

My invention is particularly applicable to regulator systems for correcting the electrical constants of a transmission line.

In the operation of transmission lines, it is customary to correct power-factor variations by the use of a synchronous condenser connected to the power circuit, and to control the excitation of the synchronous condenser by means of a voltage regulator that is connected to the circuit. Inasmuch as the voltage rise and drop on the line is a function of the power-factor variation, a voltage regulator may be adjusted to govern the synchronous condenser so as to control the value of leading or lagging current drawn from the line in accordance with the power-factor correction required. Such voltage regulator however, is sensitive only to power-circuit conditions and is not sensitive to conditions of the synchronous condenser.

The excitation of the synchronous condenser may, therefore, be increased or decreased to such degree that the leading or the lagging current taken by the condenser increases to a value that will overload the machine.

One object of my invention is to provide a regulator of the above-indicated character with means for limiting the ohmic or the reactive power load of a dynamo-electric machine.

Another object of my invention is to provide such load-regulating means with means for preventing hunting action. The invention is applicable for limiting the leading or the lagging current drawn from a transmission line by a synchronous condenser.

My invention will be better understood by reference to the accompanying drawing, wherein—

Figure 1 is a diagrammatic view illustrating an embodiment of my invention using a single magnetic core that is sensitive to the regulated quantity, and Fig. 2 represents a form of the invention wherein a pair of relays are used to limit the regulated quantity in the one or the other direction.

Referring to the drawing, Fig. 1 illustrates a dynamo-electric machine 1, having an armature winding 2 and a field winding 3, and connected to a three-phase power circuit 4, 5, 6. The field winding 3 is connected to an exciter generator 7 having an armature winding 8 and a field winding 9. In circuit with the generator field winding 3, a rheostat 11 has a resistor element 12 and a movable contact making arm 13 that is operated by a pilot motor 14.

The pilot motor 14 comprises an armature winding 15 and a field winding 16. The field winding 16 is connected to any suitable source of direct-current supply, such as conductors 17 and 18 that are energized from the exciter generator 7. The armature winding 15 is connected to a pair of reversing switches 19 and 21 that are operated in accordance with the action of a voltage regulator 22 and a load-limiting regulator 23.

The reversing switches 19 and 21 are respectively provided with contact-making arms 24 and 25, which are connected to opposite sides of the pilot motor armature winding 15 by means of conductors 26 and 27, and are normally retained in their illustrated positions by any suitable biasing means, such as spring members 28 and 29. The engaging contact members 31 and 32 of reversing switch 19 and engaging contact members 33 and 34 of reversing switch 21 are connected by means of conductor 35 to the supply conductor 17. The switch 19 is further provided with contact members 36 and 37 and the switch 21 is further provided with contact members 38 and 39, that are adapted to connect the contact-making arms of the switch with a conductor 41 that is connected to the supply conductor 18. The reversing switches 19 and 21 are also provided with operating magnets including coil windings 42 and 43, respectively, that are connected, by means of conductors 44 and 45, to supply conductor 17 and also, by means of conductors 46 and 47, respectively, to contact members 48 and 49 of the voltage regulator 22 and to contact members 51 and 52 of the load-limiting regulator 23.

The voltage regulator 22 is provided with a pivoted lever 53 upon which are mounted contact members 54 and 55 that cooperatively engage the contact members 48 and 49, respectively. The lever 53 is actuated by an electromagnet 56 having a winding 57 that is energized, from the transformer 58, in accordance with the voltage of the power circuit 5, 4, 6. The contact members 54 and 55 are connected through lever 53 and conductor 59 to the supply conductor 18.

The contact members 48 and 49 are mounted upon a bifurcated lever 61, that is pivotally supported at the point 62, and is actuated by an electromagnet 63 that operates against the pull of a tension member 64. The winding 65 of the electromagnet 63 is connected across the field winding 3 of the dynamo-electric machine so as to be actuated in accordance with the excitation of the field winding.

The load-limiting regulator 23 is provided with a pivoted lever 66, which carries a pair of contact members 67 and 68 that cooperate to engage the contact members 51 and 52. The lever 66 is provided with suitable means, for normally maintaining it in its neutral or middle position, such as the spring member 69, and with an electromagnet 71 that is operative to swing the lever in the one or in the other direction from its neutral position.

The electromagnet 71 is provided with a voltage winding 72, which is connected to be energized from the transformer 58 in accordance with the voltage of the power circuit, and with a pair of differentially-related current coils 73 and 74, which are connected in series relation with each other and with a current transformer 75 that is connected in one conductor of the dynamo electric machine 1 so as to be sensitive to the current flowing to or from that machine.

The current coils 73 and 74 and the voltage coil 72 are symmetrically placed with respect to each other and with respect to the core of the electromagnet 71 when in its neutral or mid-position. Contact members 51 and 52 are carried by a bifurcated lever 76, which is mounted upon a pivot 77, and is actuated by an electromagnet 78 acting against the pull of a tension member 79. The electromagnet 78 is provided with a coil winding 81 that is connected across the field winding 3 of the dynamo-electric machine 1 so as to be sensitive to the excitation voltage thereof.

A pair of restraining electromagnets 82 and 83 are provided for the lever 53 of the voltage regulator 22 and are connected in series circuit relation with the contact members 51 and 52, respectively, of the load-limiting regulator 23, so that when the contact members of the load-limiting regulator are engaged, the voltage regulator 22 will be rendered temporarily inoperative.

In the form of the invention that is illustrated in Fig. 2 of the drawing, a load-limiting regulator 80 is substituted for the regulator 23 of Fig. 1 and comprises a pair of contact-making relays 84 and 85. The relay 84 is provided with a pair of engaging contact members 86 and 87 that are connected in parallel circuit relation to the contact members 48 and 54 of the voltage regulator 22, and the relay 85 is provided with a pair of engaging contact members 88 and 89 that are connected in parallel circuit relation to the contact members 49 and 55 of the voltage regulator 22, for a purpose to be hereinafter set forth. The contact members 86 and 88 of the relays 84 and 85 are connected, by means of a conductor 91, through the electromagnets 82 and 83 of the voltage regulator and, by means of conductors 59 and 41, to the supply conductor 18. The contact member 87 is connected, by means of conductor 46, to the operating coil 42 of the reversing switch 19, and the contact member 89 is connected, by means of conductor 47, to the operating coil 43 of the reversing switch 21.

The relays 84 and 85 are provided with voltage coils 92 and 93 that are connected in series circuit relation and are also connected to be energized from the transformer 58 in accordance with the voltage of the power circuit 4, 5, 6. The relays 84 and 85 are also provided with differentially-related pairs of current windings 94 and 95, 96 and 97, which are connected in series circuit relation with current transformers 75 thus being energized in accordance with the current traversing dynamo-electric machine 1.

The contact members 86 and 88 of the relays 84 and 85 are mounted, respectively, upon movable arms 98 and 99, which are normally biased downwardly by tension members 101 and 102, respectively. Anti-hunting electromagnets are provided having windings 103 and 104 that are respectively connected in circuit with the contact members of the relays 84 and 85, so that, as the relay contact members are engaged, the anti-hunting magnets will be energized and tend to separate the contact members, thereby insuring a step-by-step action by the regulator.

The operation of the systems is as follows: The voltage regulator 22 operates to vary the excitation upon the dynamo-electric machine 1 to correct for either leading or lagging current upon the transmission line in accordance with voltage variations of the line that are caused by variations in power-factor. It is well known that, when an inductive load connected to a power-circuit is increased, the power-factor of the line is changed and there is an increase in the lagging reactive component of current flowing in the line. This reactive component of current represents a power loss and is accompanied by a voltage drop in the line. This condition may be corrected by drawing from the line a leading reactive current of like value. A well known manner of doing this is to vary the field excitation of a synchronous machine connected to the line in accordance with the voltage variations of the line. The regulator is so adjusted as to cause the synchronous machine to take leading or lagging current from the line of such a value as to maintain the power-factor of the line at approximately a predetermined value. The voltage coil 72 of load-limiting regulator 23 is mounted so that its center corresponds to the center of the magnetic core of the electromagnet 71 when the magnet is in its neutral or mid-position. The current coils 73 and 74 are differentially wound with respect to each other and are placed symmetrically with respect to the core of the electromagnet 71 and with respect to the voltage coil 72, so that the current windings also tend to hold the core of the magnet in its mid-position when the current coils alone are energized.

If the currents traversing the voltage coil 72 and the circuit of the current coils 73 and 74 have a phase relation of 90° with respect to each other, the coils would have the same effect upon the magnet as though each was energized separately. That is to say, in this case the core of the magnet will be held in its central position with respect to the energizing coils. It will be noted that the voltage coil 72 is connected to be energized from the power circuit conductors 4 and 6, and that the current coils 73 and 74 are connected to be energized from the machine conductor that is connected to the power-circuit conductor 5.

The ohmic component of current in the conductor 5 normally has a phase displacement of 90° with respect to the voltage across the conductors 4 and 6, and the reactive component of current in the conductor 5 and in the transformer 75 will have a phase displacement of zero or 180° with respect to the voltage across the conductors 4 and 6, depending upon whether the reactive component of current is leading or lagging with respect to the voltage. It will be clear, therefore, that the phase relation required to operate the magnet 71 corresponds to the reactive current drawn by the synchronous condenser 1 from the power circuit 4, 5, 6.

Should the current of the transmission line become leading, the voltage of the conductors 4, 5, 6 will rise, and the regulator 22 will operate to engage the contact members 48 and 54, thereby actuating the reversing switch 19 to operate the rheostat 11 in a direction to reduce the excitation of field winding 3. As the excitation of the field winding is reduced, the energization of the anti-hunting magnet 63 is also reduced, thus permitting the spring member 64 to act so as to disengage the contact members 48 and 54. The regulator 22 will normally function to govern the synchronous condenser 1 in accordance with the power-factor correction required by the power circuit 4, 5, 6.

Should the value of the lagging current taken by the condenser exceed a safe value, or the value for which the load-limiting regulator 23 is set to operate, this regulator will be actuated so as to cause engagement of the contact members 52 and 68, which are in parallel circuit relation to the contact members 48 and 54 of the voltage regulators 22, and cause the rheostat 11 to be operated in a direction to increase the excitation of field winding 3. When the contact members 52 and 68 are engaged, the electromagnet 83 will be energized and will cause the separation of the voltage regulator contact members 48 and 54 at the proper time.

As the excitation of the field winding 3 is increased, by reason of the action of the load-limiting regulator 23, the energization of the magnet 78 will also be increased, thus causing separation of the contact members 52 and 68. The electromagnet 63, therefore, acts as an anti-hunting magnet for the voltage regulator 22 and the magnet 78 acts as an anti-hunting magnet for the load-limiting regulator 23.

Should the current of the transmission line become lagging, the voltage of the power circuit 4, 5, 6 will drop and the regulator 22 will, therefore, operate to increase the excitation of the synchronous condenser, thus causing leading current to flow from the power circuit to the condenser. Should the value of this leading current exceed a safe value, or that value for which the load regulator 23 is adjusted, the electromagnet 71 will operate in the reverse direction, thereby causing engagement of the contact members 51 and 67 to energize the electromagnet 82 to interrupt the action of the voltage regulator, and also to actuate the reversing switch 19, thus operating the rheostat 11 in a direction to cause the voltage of the exciter 7 to drop.

In the form of the invention illustrated in Fig. 2, it will be noted that the contact members 86 and 87 of the relay 84 are connected in parallel circuit relation to the contact members 48 and 54 of the voltage regulator 22 and will, therefore, operate, when engaged, to decrease the excitation of the synchronous condenser; likewise, the contact members 88 and 89 of the relay 85 are connected in parallel circuit relation to the contact members 49 and 55 of the voltage regulator and are, therefore, operative, when engaged, to increase the excitation of the synchronous condenser.

It will be noted that the circuits of the electromagnets 84 and 85 are such that if one of these magnets tends to pull up, the other tends to pull down. When the power-factor of the transmission line is leading, the power-factor of the condenser is lagging, and the relay 85 is energized in a direction to engage the contact members 88 and 89. When the current of the transmission line is lagging, the current of the synchronous condenser will be leading and the magnet of the relay 84 will pull up to close contact members 86 and 87, thereby decreasing the excitation of the synchronous condenser. Upon engagement of the contact members of the relays 84 and 85, the anti-hunting coils 103 and 104 will, respectively, be energized, thus causing the magnet to pull down and produce a step-by-step action of the regulator. The relays 84 and 85 are operative, upon the occurrence of a predetermined value of reactive power, depending upon the tension of the springs 101 and 102, to assume control of the condenser field rheostat 11. In the form of invention illustrated in Fig. 2, it will be noted that the coils 82 and 83, which are operative to interrupt the action of the voltage regulator 22, are connected through conductors 91 and 59 so that both coils are energized upon the closure of either the relay 84 or the relay 85, thereby causing the lever 53 to be actuated to its neutral or midposition.

My invention has been described as applied to a synchronous condenser for limiting the flow of reactive power to the condenser, but it may be applied to limiting the reactive or the ohmic component of power to any dynamo-electric machine, such as a generator or a motor.

Many modifications of my invention may be made in the circuits and apparatus disclosed without departing from the spirit of my invention, and I do not wish to be limited other than by the scope of the appended claims.

I claim as my invention:

1. In a regulator system, the combination with a supply circuit and a dynamo-electric machine connected to said supply circuit, of a motor-operated rheostat for governing the excitation of said dynamo-electric machine, a regulator for normally controlling the operation of said rheostat, and a regulator that is sensitive to the reactive component of machine current for regulating said machine under predetermined conditions.

2. In a regulator system, the combination with a supply circuit and a dynamo-electric machine connected to said supply circuit, of a motor-operated rheostat for governing the operation of said machine, a regulator for normally controlling the operation of said rheostat, and a regulator that is operative upon the occurrence of a predetermined value of the reactive component of machine current for assuming operation of said rheostat.

3. In a regulator system, the combination with a supply circuit and a dynamo-electric machine connected to said supply circuit, of a regulator actuated in accordance with the voltage of said supply circuit for governing the excitation of said dynamo-electric machine and comprising a pair of contact members that are operative to cause a decrease in the excitation of said machine and a pair of contact members that are operative to cause an increase in the excitation of said machine, and a regulator actuated in accordance with the reactive component of current of said machine comprising pairs of contact members connected in parallel circuit relation to the contact members of the first-named regulator.

4. In a regulator system, the combination with a supply circuit and a dynamo-electric machine connected to said supply circuit, of means for governing the excitation of said dynamo-electric machine comprising a circuit for increasing the excitation of said machine and a circuit for decreasing the excitation of said machine, regulator means for controlling said circuits in accordance with the voltage of said supply circuit, and regulator means for controlling said circuit in accordance with the reactive current of said machine.

5. In a regulator system, the combination with a supply circuit and a dynamo-electric machine connected to said supply circuit, of a control circuit that is effective to cause a decrease in the excitation of said machine and a control circuit that is effective to cause an increase in the excitation of said machine, regulator means for controlling said control circuits in accordance with the voltage of said supply circuit, and regulator means for controlling said control circuits comprising a magnet operated in accordance with the reactive power of said machine and a magnet operated in accordance with the machine excitation to prevent hunting action.

6. In a regulator system, the combination with a supply circuit and a dynamo-electric machine connected to said supply circuit, of a control circuit that is effective to cause a decrease in the excitation of said machine and a control cricuit that is effectvie to cause an increase in the excitation of said machine, regulator means for controlling said control circuits in accordance with the voltage of said supply circuit, and regulator means for controlling said circuits in accordance with the reactive leading current and the reactive lagging current of said system.

7. In a regulator system, a power circuit, a dynamo-electric machine connected to said power circuit, a regulator actuated in accordance with the voltage of said power circuit for governing the excitation of said dynamo-electric machine, and a regulator actuated in accordance with the wattless component of machine current for governing the excitation of said dynamo-electric machine, said last-named regulator comprising a relay that is sensitive to the reactive component of machine current, being actuated to one operative position upon the flow of leading current in said machine and being actuated to a second operative position upon the flow of lagging current in said machine.

8. In a regulator system, a power circuit, a dynamo-electric machine connected to said power circuit, a regulator actuated in accordance with the voltage of said power circuit for governing the excitation of said dynamo-electric machine, and a regulator for governing the excitation of said dynamo-electric machine to limit the reactive machine current comprising a relay that is sensitive to a predetermined value of leading current and to a predetermined value of lagging current.

9. In a regulator system, the combination with a supply circuit and a dynamo-electric machine connected to said supply circuit, of regulator means for governing the excitation of said dynamo-electric machine comprising means operative to increase the excitation of said machine and means operative to decrease the excitation of said machine, means for actuating said regulator means in accordance with an electrical condition of said supply circuit, and means sensitive to an electrical condition of said dynamo-electric machine for limiting the range of operation of said regulator means in either direction.

10. In a regulator system, the combination with a supply circuit and a dynamo-electric machine connected to said supply circuit, of means for governing the excitation of said dynamo-electric machine comprising a circuit for decreasing the excitation of said machine, and a circuit for increasing the excitation of said machine, regulator means for controlling said circuits in accordance with an electrical quantity of said supply circuit, and regulator means for controlling said circuits in accordance with an electrical quantity of said dynamo-electric machine.

11. In a regulator system, a power circuit, a dynamo-electric machine connected to said power circuit, a regulator actuated in accordance with an electrical quantity of said power circuit for governing the excitation of said dynamo-electric machine, and a regulator for limiting the excitation of said dynamo-electric machine comprising a relay that is operable in the one or in the other direction under predetermined power-factor conditions in said dynamo-electric machine.

In testimony whereof, I have hereunto subscribed my name this 24th day of June, 1925.

FRANKLIN E. HARDY.